June 9, 1936.　　　　B. W. STORY　　　　2,043,816
COLORIMETER
Filed July 7, 1934　　　　3 Sheets-Sheet 1
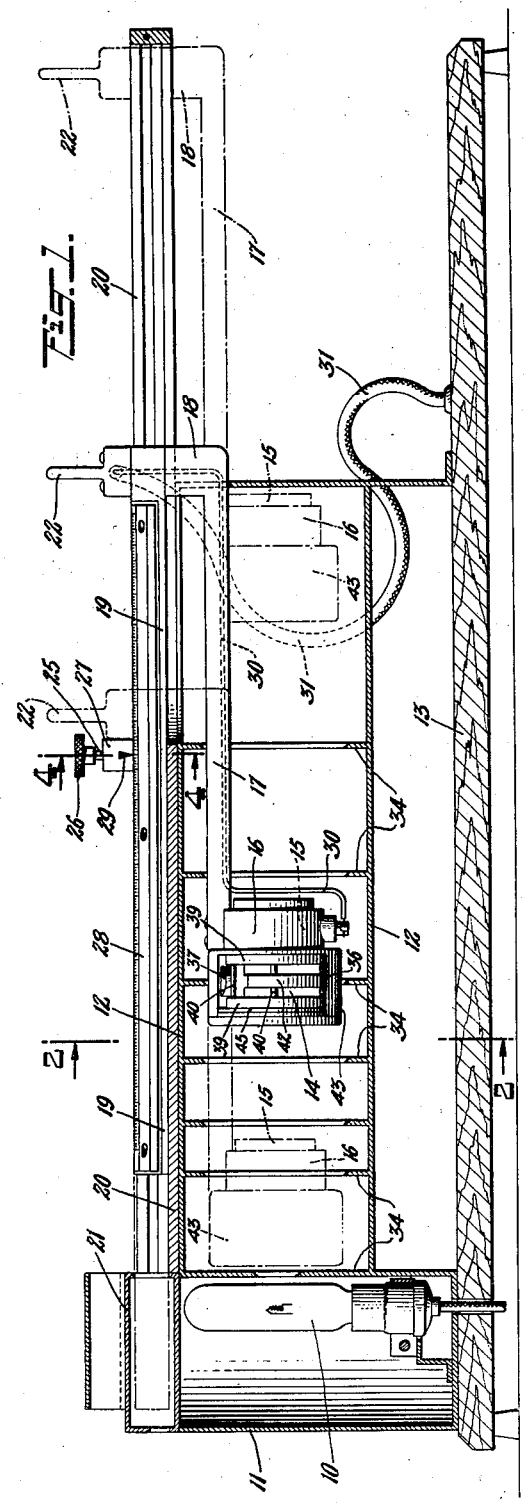
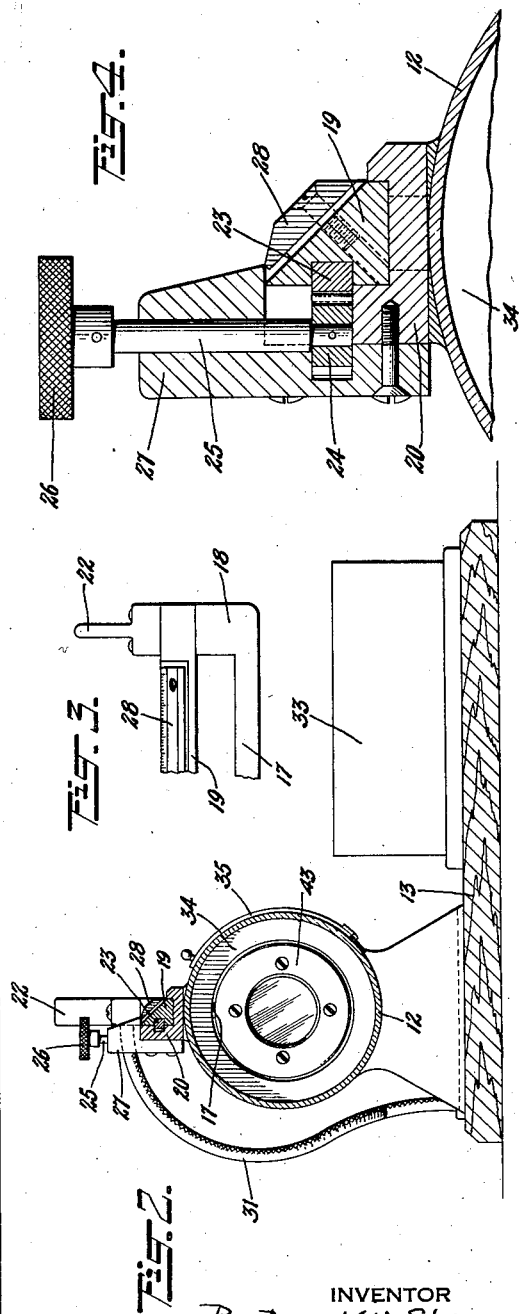
INVENTOR
Bertrand W. Story
BY
Farnum F. Dorsey
his ATTORNEY

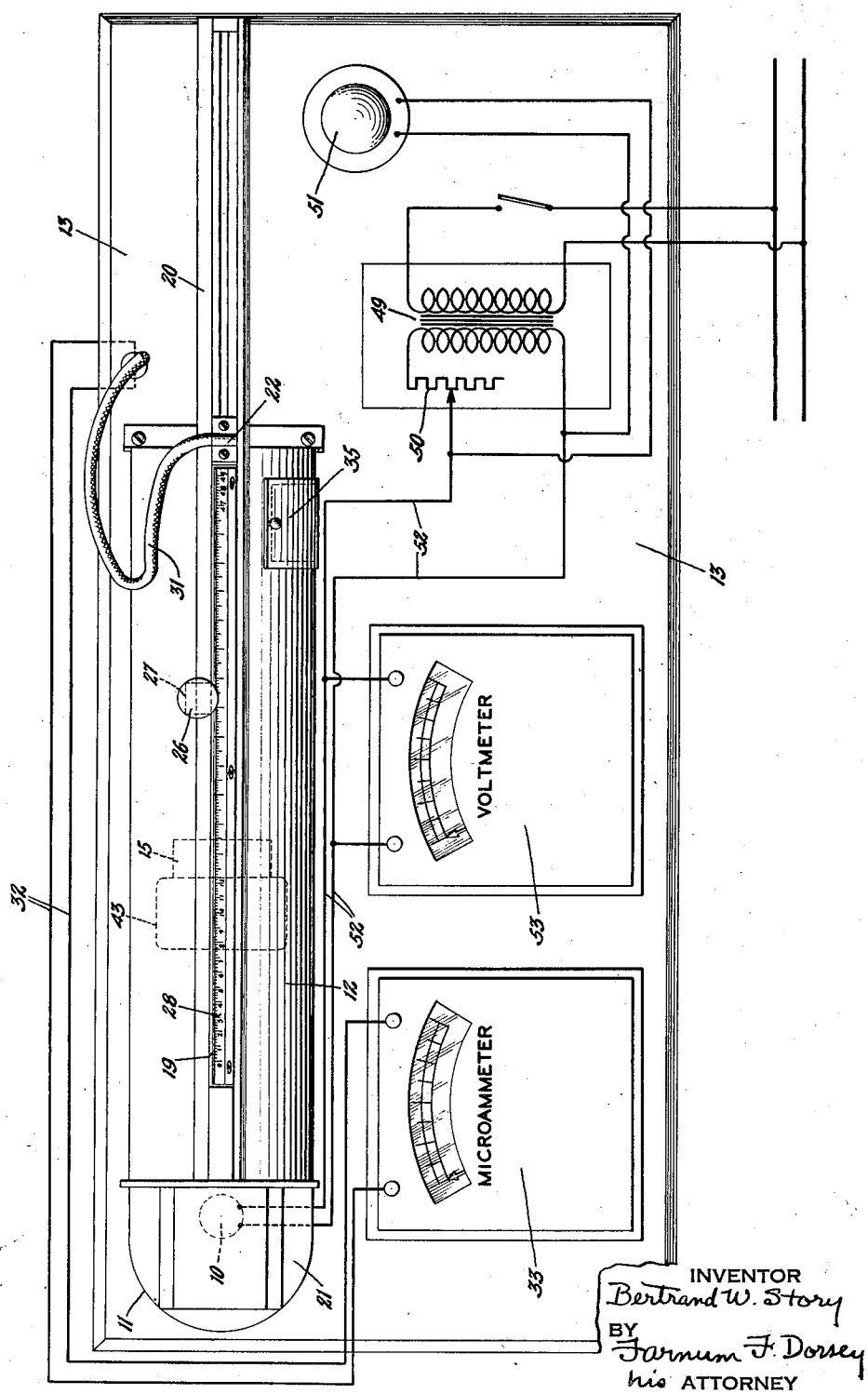

June 9, 1936.  B. W. STORY  2,043,816
COLORIMETER
Filed July 7, 1934   3 Sheets-Sheet 3
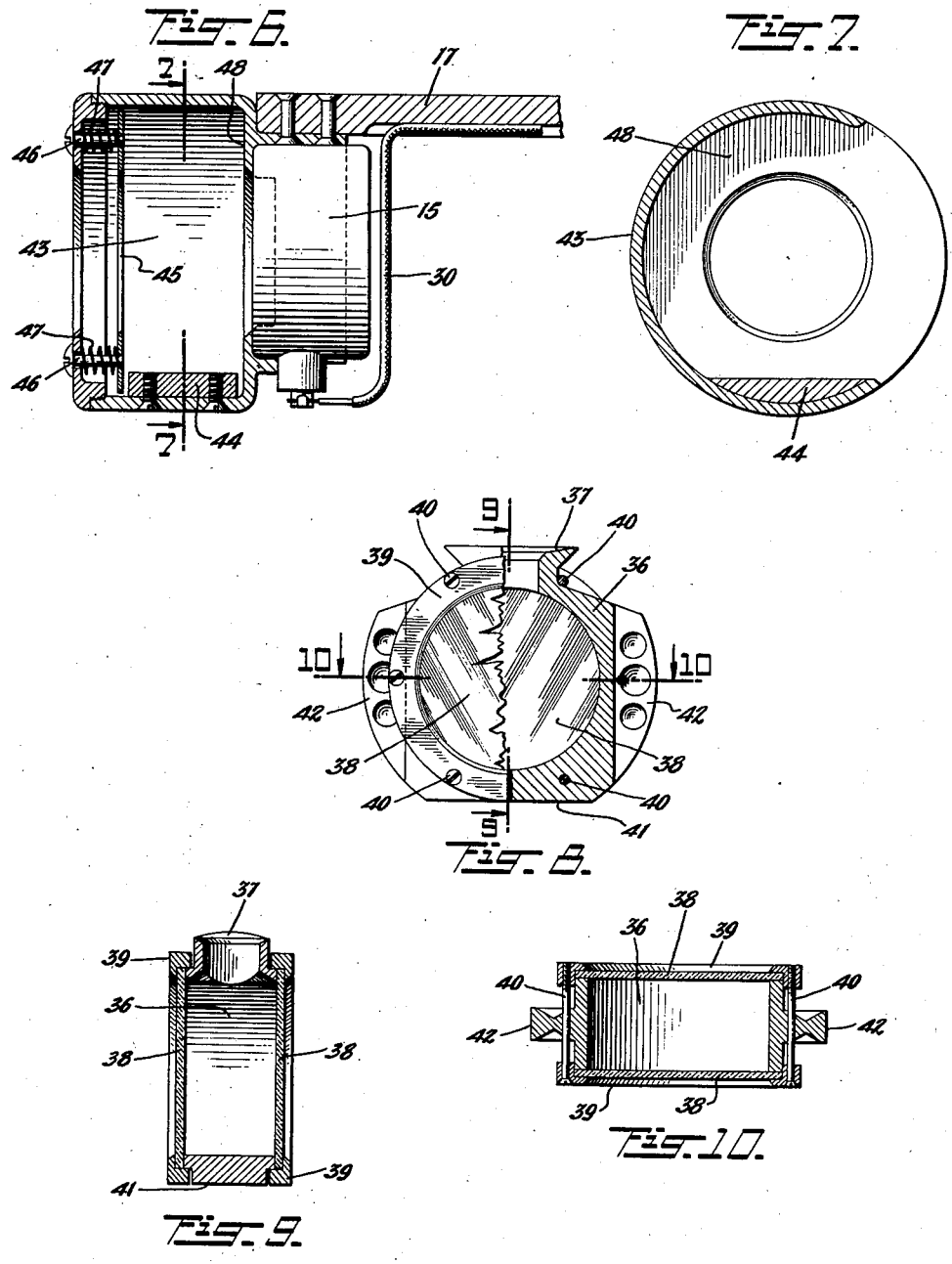
INVENTOR
Bertrand W. Story
BY
Farnum F. Dorsey
his ATTORNEY Patented June 9, 1936

2,043,816

UNITED STATES PATENT OFFICE 2,043,816

COLORIMETER

Bertrand W. Story, Wenonah, N. J., assignor to Socony-Vacuum Oil Company, Incorporated, New York, N. Y., a corporation of New York Application July 7, 1934, Serial No. 734,092

2 Claims. (Cl. 88—14)

This invention relates to the measurement of the light transmitted by a substance, in terms of the incident light, as determined with respect to the relative spectral response of the so-called normal eye.

The object of the invention is to produce a simple and accurate device for measuring the color of oils and the like, particularly petroleum oils, without the need of standard colors or other means for direct comparison, and for giving readings of relative lightness or darkness which agree approximately with ratings which the normal human eye would give but which are independent of the idiosyncrasies of the observer.

In the manufacture of petroleum oils it is common practice to grade oils with respect to their over-all lightness or darkness as they appear to the eye. In other words, oils are rated on visual brilliance. The hue varies from water white for the lightest oils, through various shades of yellow, orange, and red to almost black for the darkest oils, since there is a difference in the kind of light absorbed by the oils as well as the total amount. The absorbed band extends progressively from the violet to the red end of the spectrum in the case of oils arranged in a series from light to dark, but this band is not the same for all oils rated, by the human eye, as of equal darkness or color intensity.

It is well known that the human eye does not respond uniformly to light throughout the visible spectrum. The eye is relatively insensitive to violet and blue, very sensitive to green and again insensitive to the red regions. As the light absorption of petroleum oils may involve any or all of these regions, it is evident that any device which is substituted for the eye must have a relative spectral response approximating that of the eye. Otherwise the device will not rate the relative darkness of a color the same as the eye does. As the control of color is largely to preserve a uniform appearance, the effect on the eye must be considered.

Various methods for measuring the relative darkness of oils have been used. Most of them use an arbitrary series of comparison standards consisting of colored glasses, chemical solutions or other means wherein the hue, saturation and brilliance are adjusted to approximate those of average petroleum oils. An optical comparison is then made between the oil in question and the series of standards, and the oil is assigned a "color" value corresponding to the member of the series which most nearly matches it. Since petroleum oils vary considerably in the individual attributes of color, an oil may not match any of the standard color glasses or solutions. It then becomes a matter of discretion on the part of the operator as to whether he will be guided by hue or brilliance, and different operators often fail to agree on the "color" value which should be given to the oil. In plant control of petroleum refining such disagreement may lead to serious confusion.

I have found that the difficulties and defects of the methods involving optical comparisons can be overcome by substituting, for the human eye, a photoelectric cell now available which has a relative spectral response equivalent, for all practical purposes, to that of the normal human eye. By the use of such cell, as disclosed hereinafter, I have been able to evaluate oils photoelectrically in the same order of relative color intensity as by other systems involving optical evaluation, but without the uncertainty due to those influences common to systems of optical evaluation and resulting from the variable susceptibility of the human eye to hue and saturation.

Instead of comparing the color of the oil or other sample with an arbitrary series of color standards, which are difficult to reproduce, I measure the color in terms of the light absorbed, as indicated by the change in the distance of the light source necessary to counteract such absorption. In this way another difficulty is eliminated, namely, that of calibrating instruments to give the same result notwithstanding variations in the lamps, photoelectric cells and micro-ammeters which are used in them. If the color were measured in terms of the cell output, all of these parts would have to be standardized. If, however, a reading is taken through a standard water-white oil, with the lamp at a standard distance, and the distance is then reduced so that the oil under test gives the same reading, inequalities between lamps, photoelectric cells and micro-ammeters cancel out and all instruments read exactly alike. The white oil standard is used only to compensate for oil-cell reflections. While the reading of the instrument is independent of the absolute brilliancy of the source of light, within the scope of the micro-ammeter used to indicate the cell output, it is necessary to hold this brilliancy constant during the examination of any particular sample, but this is easily done by the use of a constant voltage transformer for energizing the lamp.

The color of the oil is indicated directly, as a function of the distance between the lamp and the cell, by a scale which may be calibrated in inches, millimeters, or any standard or arbitrary units to give the desired color gradations. In the instrument herein described and illustrated the standard or extreme distance between the lamp and the cell is half a meter, and the scale is calibrated in millimeters.

The invention resides, accordingly, in a colorimeter in which the principles hereinbefore described are utilized, and in the various novel mechanical features of the instrument illustrated in the accompanying drawings and hereinafter described and claimed.

In the accompanying drawings, Fig. 1 is a sectional side elevation of a colorimeter embodying the present invention. Fig. 2 is a section on the line 2—2 in Fig. 1. Fig. 3 is a detail view, in side elevation, of a portion of the mechanism for supporting and moving the sample and the photoelectric cell. Fig. 4 is a detail view, on a larger scale, in section on the line 4—4 in Fig. 1. Fig. 5 is a plan view of the colorimeter, with the electrical connections shown diagrammatically. Fig. 6 is a side view, partly in section, of the support for the photo electric cell and oil container. Fig. 7 is a sectional view on the line 7—7 in Fig. 6. Fig. 8 is a partly sectional front elevation of the oil container, and Figs. 9 and 10 are sectional views on the lines 9—9 and 10—10, respectively, in Fig. 8.

The invention is illustrated as embodied in a machine in which the source of light is an ordinary electric projection lamp 10, having a concentrated filament giving a sufficiently close approximation to a point source of light. This lamp is mounted on a stationary support in a housing 11 attached to one end of a horizontal tubular body 12. The housing and the body are mounted on a baseboard 13, which supports all parts of the apparatus.

The sample 14, which is to be examined, and the photoelectric cell 15, are supported in close juxtaposition by a generally cylindrical holder 16 which is carried at the end of a horizontal arm 17 extending lengthwise, to a variable extent, into the body 12. At the outer end of the arm 17 is an upward projection 18 which is fixed to one end of a slide bar 19. This bar fits closely and slides in a guideway formed in a guide member 20, which is fixed in horizontal position along the top of the body. The right-hand portion of the guide is slotted to permit the movement of the member 18 necessary to bring the support 16 close to the lamp 10, as shown in dotted lines in Fig. 1, or to be drawn away to the extreme right-hand end of the body, as similarly shown. With the parts in their extreme left-hand position the end of the slide bar 19 extends over the top of the lamp and into a small chamber 21 at the top of the lamp housing, which is provided merely for the purpose of affording the necessary space. The U-shaped carrier comprising the members 17, 18 and 19 may be moved quickly, for rough adjustment, by means of an upwardly projecting handle member 22. For exact final adjustment means are provided, as shown particularly in Fig. 4, comprising a rack bar 23 fixed lengthwise in the slide bar 19, and a pinion 24 which engages the rack and is mounted at the lower end of a shaft 25. This shaft carries a knurled head 26 at its upper end, and it is journaled in a bearing block 27 fixed to the back of the slide guide 20.

By means of the carrier just described the sample and the cell may be moved toward and from the lamp along a horizontal straight line radial to the filament of the lamp and coincident with the longitudinal axis of the body 12.

The readings of the instrument are taken from a scale 28 which is fixed to a sloping upper surface on the slide bar 19. This scale is graduated to indicate the required color characteristic as a function of the distance through which the photoelectric cell is moved toward the source of light, the exact character of graduations depending on the arbitrary scale of value which may be used. An index mark 29 on the front of the bearing block 27 cooperates with the scale to indicate the significant point.

The photoelectric cell 15 is connected with a stationary electrical measuring instrument, through wires 30 which pass along a groove in the lower surface of the arm 17, thence upwardly through the member 18 and out through a passage in the handle member 22, where they are connected with flexible leads in a cable 31 which extends to the baseboard and is of sufficient length to accommodate itself to the movements of the carrier mechanism. From the cable 31 wires 32 extend, as shown diagrammatically in Fig. 5, to a micro-ammeter 33 mounted on the baseboard. In the construction shown the photoelectric cell is of a type which, when subjected to light rays of the intensity used in this apparatus, generates a current sufficient for definite indication in the micro-ammeter.

Since the instrument operates on the theory that the light received by the cell will vary in inverse proportion to the distance of the cell from the source, it is important to exclude, as far as possible, all light proceeding from any direction other than that of the filament of the lamp. The inner surface of the body 12 is accordingly blackened to prevent reflection, and as a further precaution it is provided with a series of annular diaphragms 34 having central openings only sufficiently large for the passage of the direct light rays and to afford clearance for the moving parts. The right-hand end of the body is, for the same reason, closed except for slots in the end and in the upper side necessary to afford clearance for the member 18. To provide for the introduction and removal of the samples the body is provided, near its right-hand end, with an opening which is normally closed by a door 35.

Where the sample to be examined is oil or other liquid, it may be held in a container shown particularly in Figs. 8, 9 and 10. This container has a generally cylindrical body 36 provided, at the top, with a filling neck 37. The front and the back of the container are closed by sheets of clear glass 38, and the body of the container is formed to an exact predetermined dimension from front to rear so that the horizontal extent or thickness of the body of oil through which the light rays pass is definitely predetermined. The glasses are held in place by clamp rings 39 connected by screw bolts 40. The body of the container has a flat surface 41 at the bottom, to provide a base upon which it may rest when in use. At the sides the body has two reduced portions or ears 42, serving as handles by which it may be conveniently introduced into or removed from the machine.

The holder which furnishes a support for the photoelectric cell and the oil container is shown particularly in Figs. 6 and 7. It comprises a generally cylindrical body 43 which is divided, by an annular partition 48, into forward and rear chambers. The forward chamber has a lateral opening for the reception of the oil container, as shown in Fig. 7, and is provided, at the bottom, with a base member 44 having a flat upper surface on which the bottom of the oil container rests. To hold the container firmly in proper position, a friction ring 45 is used, this ring being mounted on studs 46 which slide through openings in the front of the holder and which are surrounded by springs 47. By these means the friction ring is pressed firmly against the oil container and holds the latter frictionally in place against the partition 48.

Since the accuracy of the instrument depends upon the constancy of the source of light, means are provided for maintaining a substantially constant voltage in the light circuit. For this purpose the light is energized, from a suitable source of alternating current, through a substantially constant voltage transformer 49, shown diagrammatically in Fig. 5, the voltage effective in the secondary winding being practically constant and independent of the primary voltage. Minor voltage adjustments of the lamp may be made by the use of the series resistance 50. The secondary circuit is connected to the lamp 10 through wires 52, and the effective voltage is indicated by a voltmeter 53. A signal lamp 51 shows when the instrument is energized.

In using the instrument as a colorimeter for petroleum oil, the following procedure is used. An oil container is filled with colorless or white oil and inserted in the holder, which is then moved to bring the extreme left-hand or zero reading of the scale in line with the index mark 29. The photoelectric cell, by light transmitted through the colorless oil, generates a small current which is read upon the micro-ammeter, the reading being noted as the standard reading. The oil container is then removed and a similar one, containing oil of which the color is to be measured, is introduced in its place. Owing to the partial interception of the light rays by the colored oil, the photoelectric cell then gives a lower reading on the micro-ammeter. The cell carrier is then moved to bring the sample and the cell nearer to the lamp, until the micro-ammeter gives the predetermined reading. The color value of the sample may then be read directly from the scale, if it is graduated in accordance with the desired convention. If the scale is graduated in other units, the color value of the oil may be determined by reference to a suitable conversion table.

The particular form and construction of the photoelectric cell are not essential features of the instrument, but the cell illustrated in outline is of a type now commercially available, which requires no externally impressed voltage and which has a spectroscopic response closely approximating that of the normal human eye in the regions of the visible spectrum which are of importance in the color measurement of refined petroleum oils.

The instrument is described as arranged for movement of the photoelectric cell and the sample, while the lamp remains stationary. This particular arrangement is not essential, however, but is adopted because it is more convenient than the movement of the relatively bulky lamp and the means for its proper ventilation.

I claim as my invention:

1. In a colorimeter, the combination of a point source of light, a housing extending from the source of light, a support for a translucent specimen and a photoelectric cell, an arm, on which said support is carried, extending into said housing, means, outside the housing, for guiding said arm and for moving it in a direction to carry the support directly toward and from the source of light, and a scale indicating the position of the support and graduated in accordance with a function of the distance between the source of light and the photoelectric cell.

2. In a colorimeter, the combination of an elongated housing, a support at one end of the housing, a second support movable, within the housing, toward and from the first support, an arm, carrying the second support, extending from the end of the housing, a second arm, generally parallel with the first arm fixed to the outer end of the first arm and extending along the outside of the housing, a slide-guide in which the second arm is movable, a point source of light on one of said supports, a photoelectric cell and means for holding a translucent specimen on the other support, and means, for indicating the position of the movable support, graduated in accordance with a function of the distance between the source of light and the photoelectric cell.

BERTRAND W. STORY.